United States Patent [19]

Knudsen

[11] Patent Number: 4,504,458

[45] Date of Patent: Mar. 12, 1985

[54] GYPSUM CONVERSION

[75] Inventor: Knud C. B. Knudsen, Holte, Denmark

[73] Assignee: Superfos A/S, Vedbaek, Denmark

[21] Appl. No.: 528,712

[22] Filed: Sep. 1, 1983

[30] Foreign Application Priority Data

Sep. 2, 1982 [GB] United Kingdom ................ 8225006

[51] Int. Cl.³ ...................... C22B 26/20; C22B 26/10; C01D 15/06
[52] U.S. Cl. .................................... 423/552; 423/157; 423/181; 423/497; 210/667; 210/680
[58] Field of Search ............... 423/157, 181, 162, 497, 423/544, 552; 210/667, 668, 670, 683

[56] References Cited

U.S. PATENT DOCUMENTS

| | | | |
|---|---|---|---|
| 2,366,650 | 1/1945 | Rawlings et al. | 423/181 |
| 2,736,635 | 2/1956 | Haywood | 423/181 |
| 2,989,370 | 6/1961 | Lee et al. | 423/424 |
| 3,096,153 | 7/1963 | Hadzpriga | 423/181 |
| 3,402,018 | 9/1968 | Waters et al. | 423/552 |
| 3,445,185 | 5/1969 | Scherzberg et al. | 423/552 |
| 4,193,772 | 3/1980 | Sharp | 423/181 |

FOREIGN PATENT DOCUMENTS

| | | | |
|---|---|---|---|
| 528345 | 7/1956 | Canada | 423/552 |
| 741730 | 8/1966 | Canada | 423/181 |
| 437652 | 11/1935 | United Kingdom | 423/552 |
| 2068918 | 8/1981 | United Kingdom | 423/552 |

OTHER PUBLICATIONS

Lindsay et al., Basic Operating Characteristics of a Strongly Basic Anion Exchanger, Industrial & Engineering Chemistry, May 1951, pp. 1085–1087.

Primary Examiner—Gary P. Straub
Attorney, Agent, or Firm—Lawrence Rosen

[57] ABSTRACT

Gypsum as a byproduct in the manufacture of phosphoric acid is converted into potassium sulphate or sodium sulphate by subjecting an aqueous slurry to anion exchange under acidic conditions. Adding solid potassium chloride to the obtained solution of potassium sulphate causes the latter to crystallize in pure state, the potassium chloride solution recovered after filtering off the crystallized potassium sulphate being used for the regeneration of the anion exchanger.

4 Claims, No Drawings

GYPSUM CONVERSION

This invention relates to a method for converting calcium sulphate into metal sulphates of higher value, and more particularly to a method for converting gypsum, which is obtained as a byproduct in the manufacture of phosphoric acid, into potassium or sodium sulphate by ion exchange.

Phosphoric acid is produced in large quantities for use in fertilizer manufacture. The phosphoric acid is generally produced by reacting phosphate rock with sulphuric acid. Phosphate rock is a naturally occuring product, the main constituent of which is fluorapatite substantially corresponding to the formula $Ca_5(PO_4)_3F$. Thus, the chemical reaction for producing phosphoric acid can be written:

$$Ca_5(PO_4)_3F + 5H_2SO_4 + 10H_2O \rightarrow 3H_3PO_4 + HF + 5CaSO_4,2H_2O \tag{1}$$

The phosphoric acid is separated from the byproduct gypsum by filtration. For each ton of $H_3PO_4$ about 3 tons of byproduct is produced.

This byproduct is known as phosphogypsum and is a product of low value due to impurities and high moisture content. It is therefore in most cases considered a waste product and discarded.

The safe disposal of the huge quantities of phosphogypsum being produced today represents an increasing environmental problem. In some areas it is deposited in ponds or piles, in which case care must be taken to prevent ground water contamination due to seepage. In other areas the gypsum is slurried with water and pumped into the ocean or into rivers. In such cases there is an increasing concern not only regarding the deposition of undissolved gypsum but also regarding the environmental effects due to the impurities, especially heavy metals, which originate from the phosphate rock.

From a natural resources point of view, also, the phosphogypsum represents a problem. The sulphuric acid used in equation (1) is produced from sulphur according to the following reactions:

$$S + O_2 \rightarrow SO_2 \tag{2}$$

$$SO_2 + \tfrac{1}{2}O_2 + H_2O \rightarrow H_2SO_4 \tag{3}$$

The prices of sulphur have increased dramatically in recent years and thereby put a heavy economic burden on the phosphoric acid production. At the same time it can be seen from equation (1), that all the expensive sulphur ends up in the waste product and only the hydrogen ions from the sulphuric acid go into the valuable product, the phosphoric acid.

On the other hand, sulphates like potassium and sodium sulphates are produced from sulphuric acid and the corresponding chlorides in the so-called Mannheim processes:

$$2KCl + H_2SO_4 \rightarrow K_2SO_4 + 2HCl \tag{4}$$

$$2NaCl + H_2SO_4 \rightarrow Na_2SO_4 + 2HCl \tag{5}$$

Here, it can be seen that it is the sulphate that ends up in the main product, whereas the hydrogen ions go into the byproduct.

From a resource point of view, therefore, it would be desirable to develop a process whereby phosphogypsum could be converted into potassium or sodium sulphate in the following way:

$$CaSO_4 + 2KCl \rightarrow K_2SO_4 + CaCl_2 \tag{6}$$

$$CaSO_4 + 2NaCl \rightarrow Na_2SO_4 + CaCl_2 \tag{7}$$

In that way the sulphuric acid could be used twice, firstly for supplying hydrogen ions for phosphoric acid production, and secondly for supplying sulphate ions for potassium and sodium sulphate production. At the same time the environmental problems relating to the phosphogypsum disposal could be solved, because it is technically possible to remove heavy metals from a calcium chloride solution, whereas it is not possible to remove them from gypsum crystals.

It is well known, that for solubility reasons the reactions (6) and (7) cannot be carried through by simple salt conversion in aqueous media.

It is the object of the present invention to provide a process whereby the overall reactions (6) and (7) are obtained by ion exchange.

The British Pat. No. 1,166,930 describes an ion exchange process where calcium ions from a solution of phosphate rock in a mineral acid are exchanged with potassium ions from a cation exchanger. The spent ion exchanger is regenerated, i.e. recharged with potassium ions, by treatment with a potassium chloride solution. If the mineral acid is nitric acid, the reactions may be written as follows, where R indicates the organic portion of the ion exchanger:

| | | |
|---|---|---|
| Production: | $Ca(NO_3)_2 + 2\,KR \rightarrow 2KNO_3 + CaR_2$ | (8) |
| Regeneration: | $CaR_2 + 2KCl \rightarrow 2KR + CaCl_2$ | (9) |
| Overall: | $Ca(NO_3)_2 + 2KCl \rightarrow 2KNO_3 + CaCl_2$ | (10) |

If phosphogypsum is slurried with water and similar processes attempted, the corresponding reactions can be written as follows:

| | | |
|---|---|---|
| Production: | $CaSO_4 + 2KR \rightarrow K_2SO_4 + CaR_2$ | (11) |
| Regeneration: | $CaR_2 + 2KCl \rightarrow 2KR + CaCl_2$ | (12) |
| Overall: | $CaSO_4 + 2KCl \rightarrow K_2SO_4 + CaCl_2$ | (6) |

This method is not industrially feasible due to the low solubility of calcium sulphate. A saturated solution of gypsum contains only about 2 grams per liter of $CaSO_4$ in solution, and when the reaction (11) takes place, the sulphate ions are not removed, which due to the solubility product limits the amount of calcium ions that can go into solution from the slurried gypsum and thereby made available for further ion exchange according to reaction (11). The result is large quantities of solutions of low concentrations and poor efficiency of the ion exchanger. The method becomes industrially unattractive.

However, it has been found that the problems can be overcome and very good results obtained, if anion exchange under acidic conditions is employed as follows:

| | | |
|---|---|---|
| Production: | $2KCl + R_2SO_4 \rightarrow K_2SO_4 + 2RCl$ | (13) |
| Regeneration: | $2RCl + CaSO_4 \rightarrow R_2SO_4 + CaCl_2$ | (14) |
| Overall: | $CaSO_4 + 2KCl \rightarrow K_2SO_4 + CaCl_2$ | (6) |

The acidic conditions in reaction (14), e.g. pH between 0 and 4, can be obtained by adding sulphuric or hydrochloric acid to the gypsum slurry.

By this method the ion exchange process in reaction (14) does not come to a stop like in reaction (11), because the solubility of gypsum in the calcium chloride solution at low pH appears to be higher than in water in spite of the high calcium ion concentration in the calcium chloride solution, i.e. the solubility product of calcium ions and sulphate ions is higher. For instance, in a 4% calcium chloride solution at pH 1—obtained by adding HCl—a solubility of 4 grams per liter of $CaSO_4$ has been found. This means, that when phosphogypsum is slurried with water and brought into contact at low pH with a chloride-loaded anion exchanger, the reaction (14) will start, and along with the removal of sulphate ions from the solution more gypsum will go into solution to supply more sulphate ions for ion exchange. In this case the further solubilization of gypsum will not be impeded like in reaction (11).

In the industrial application of the method it is important for economic reasons to avoid excessive dilution of the product solution from reaction (13) containing the potassium sulphate. Such dilution occurs in the conventional ion exchange technique using fixed bed exchangers. The British Pat. No. 1,307,218 describes a method and plant for effecting mass transfer processes, whereby this dilution is avoided. We have found that when using this method and plant for the present purpose it is preferable to use upflow instead of downflow movement of the liquids through the resin beds in order to avoid blocking of the resin bed due to the suspended gypsum crystals in reaction (14).

Furthermore, it has been found that the evaporation costs relating to the product solution from reaction (13) can be minimized by solubilizing solid potassium chloride in said production solution, whereby potassium sulphate can be crystallized out and separated, and the mother liquor can be recycled and used for reacting with the sulpate-loaded anion exchange resin in reaction (13). At the same time this procedure permits a very high surplus of KCl over the theoretical amount in reaction (13) to be used without any losses of KCl.

It is well known that an addition of a solubility depressor, f.inst. methanol, for the sulphate, to media corresponding to the recycling mother liquor will increase the ratio of chloride to sulphate in such media.

This can be utilized in the present invention to increase the efficiency of the ion exchange process and hence decrease the investment costs of a plant, and since the mother liquor is still recycled in the present process, such addition can be done without any further costs for recovering the solubility depressor.

If sodium sulphate instead of potassium sulphate is wanted, the reactions are:

| Production: | $2NaCl + R_2SO_4 \rightarrow Na_2SO_4 + 2RCl$ | (15) |
| Regeneration: | $2RCl + CaSO_4 \rightarrow R_2SO_4 + CaCl_2$ | (16) |
| Overall: | $CaSO_4 + 2NaCl \rightarrow Na_2SO_4 + CaCl_2$ | (7) |

If sea water is available and fresh water supply scarce or expensive, the phosphogypsum may be slurried with sea water instead of fresh water. Thereby the economics of the process may be further improved.

It is well known that anion exchangers generally have a higher selectivity for $SO_4^{--}$ than $HSO_4^-$ and $Cl^-$ and that the different types of exchangers have different selectivity coefficients. For the purpose of the present invention it is preferable to use a type with a very high selectivity for the sulphate ion, f.inst. Dowex WGR, which is epoxy-based, or Duolite A374 or Amberlite IRA 60 which are acryl-based.

The following examples are illustrative of the process of the invention:

EXAMPLE 1

5 kg of phosphogypsum crystals from a phosphoric acid filter were wet ground and slurried with 100 kg of sea water. The pH was adjusted to about 3 by adding sulphuric acid and the slurry was reacted with 35 liter of Duolite A 374 (a polyfunctional amine type anion exchanger based on an acrylic matrix) loaded with chloride ions. The effluent contained 2.5% $CaCl_2$. The treated anion exchanger was reacted with 40 kg of the recirculating KCl-solution mentioned below containing 25% KCl. To the effluent was added 3.5 kg solid KCl during agitation which resulted in 4 kg of $K_2SO_4$ crystallising out. After separation of the $K_2SO_4$-crystals the mother liquor was recirculated for reacting with the above-mentioned anion exchanger.

EXAMPLE 2

A pilot ion exchanger plant according to British Pat. No. 1,307,218 comprising 11 resin beds each containing 12 liter of Duolite A 374 anion exchange resin was used for this experiment. 350 liter per hour of an aqueous slurry containing 5% calcium sulphate and having a pH of 2.5 (obtained by adding sulphuric acid) was pumped into the ion exchanger loop. Simultaneously, a recirculating potassium chloride solution containing 25% KCl was pumped into the loop at a rate of 160 liter per hour. The product solution containing KCl and $K_2SO_4$ was fed continuously to a crystallizer which also received solid KCl at a rate of 13 kg per hour. The overflow from the crystallizer went to a classifier in order to separate the potassium sulphate crystals from the potassium chloride solution which was recycled to the ion exchange loop. 14 kg per hour of high purity $K_2SO_4$ was produced. A washed and dried sample of the product showed 44.7% K, 54.6% $SO_4$ and 0.02% Cl.

EXAMPLE 3

1.5 kg of calcium sulphate was slurried with 30 liter of fresh water and the pH adjusted to about 3 by adding sulphuric acid. The slurry was reacted with 12 liter of Duolite A 374 anion exchange resin loaded with chloride ions. In a sample from the effluent a content of 3% $CaCl_2$ was measured. The treated anion exchanger was reacted with 12 kg of a 24% NaCl-solution. To the effluent was added 0.85 kg solid NaCl and 1 kg of $Na_2SO_4$ was recovered by crystallization and separation.

We claim:

1. A process for converting calcium sulfate into potassium or sodium sulfate by ion exchange, comprising reacting at a pH between 0 and 4 an aqueous calcium sulfate slurry with an anion exchange resin initially loaded with chloride ion to form a calcium chloride solution and a sulfate loaded resin, regenerating the sulfate loaded resin by contacting it with a potassium chloride or sodium chloride solution to form a chloride loaded resin and a potassium sulfate or sodium sulfate solution.

2. A process according to claim 1 in which the pH is obtained by adding sulphuric or hydrochloric acid.

3. A process according to claim 1 in which solid potassium or sodium sulphate is recovered from the potassium or sodium sulphate containing solution by solubilizing solid potassium or sodium chloride in said solution, separating the precipitated potassium or sodium sulphate crystals and recycling the mother liquor after separation for reacting with the sulphate loaded anion exchanger.

4. A process according to claim 1 in which the aqueous medium in the calcium sulphate slurry is partly or wholly sea water.

* * * * *